UNITED STATES PATENT OFFICE.

LIVINGSTON GIFFORD, OF JERSEY CITY, NEW JERSEY, ADMINISTRATOR OF KARL HEUMANN, DECEASED, ASSIGNOR TO THE BADISCHE ANILIN AND SODA FABRIK, OF LUDWIGSHAFEN, GERMANY.

DIMETHYL INDIGO AND PROCESS OF MAKING IT.

SPECIFICATION forming part of Letters Patent No. 619,883, dated February 21, 1899.

Application filed December 16, 1897. Serial No. 662,220. (Specimens.)

*To all whom it may concern:*

Be it known that KARL HEUMANN, deceased, late of Zurich, Switzerland, did invent a new and useful Dyestuff Allied to Indigo, of which the following is a specification, and for which patents have been obtained in the following countries: England, No. 8,726, dated June 5, 1890; France, No. 206,567, dated June 23,1890; Belgium, No. 91,156, dated July 15, 1890; Germany, No. 58,276, dated August 15, 1890; Spain, No. 11,005, dated August 21, 1890; Italy, XXIV, 27,841, IV, 453, dated September 30, 1890, and Austria, No. 40/3,802, dated December 12, 1890.

Although ortho-tolyl-glycocol, which can be prepared by the action of mono-chlor-acetic acid on ortho-toluidin, has been known to chemists since the year A. D. 1880, (see *Journal of the Chemical Society*, 38, 387; *Berichte der Deutschen Chemischen Gesellschaft* 13, 137,) still up to the time of the present invention, it is believed that it has found no application in the arts and that it was not known that it could in any way be used in the manufacture of useful dyestuffs.

The present invention includes the discovery that by suitable treatment this body (orthotolyl-glycocol) can be converted into a new blue dyestuff possessing most valuable qualities. Judging from the manner of its formation this dyestuff is a dimethyl derivative of indigo. It differs from indigo in its chemical constitution and in some of its properties, but still resembles this most valuable dyestuff in its dyeing properties, being capable of application to the fiber in the same way and yielding slightly-different shades, so that it is capable of entirely supplanting natural indigo in many, if not all, of its applications.

The following is an example of the manner in which this new dyestuff can be prepared: Mix thoroughly about one part, by weight, of tolyl-glycocol and two parts, by weight, of solid caustic potash and heat the mixture rapidly to a temperature of about 300° centigrade and then gradually to about 335° to 340° centigrade, until the orange color of the melt no longer increases in intensity. During this operation exclude the air as far as possible. Next dissolve the melt in water and blow air through until no more blue precipitate forms. Filter, wash with water containing a little hydrochloric acid, and finally with cold alcohol, and dry the indigo compound which remains on the filter. Instead of the caustic potash in the above example caustic soda can be used or mixtures of the two alkalies. The new dyestuff thus obtained in its unsulfonated form is a dimethyl indigo and has the following composition: $C_{18}H_{14}N_2O_2$. It resembles ordinary indigo in appearance, being a dark-blue powder acquiring a copper-colored luster on rubbing. On heating it volatilizes and sublimes with purple-red vapor. It is insoluble in water and slightly soluble in alcohol, particularly when hot. It is somewhat soluble in benzene at ordinary temperatures and more easily on heating, whereas ordinary indigo is very nearly or practically quite insoluble in this liquid. It is also somewhat soluble in cold anilin. When dyed upon cotton from the indigo-vat, a greener shade of blue is obtained than with ordinary indigo. By sulfonation under suitable conditions it can be converted into new sulfo-acids, in which form, as well as in its unsulfonated form, it is generically claimed herein, but which constitutes the subject-matter also of a separate application for Letters Patent, Serial No. 662,305, filed December 17, 1897. These sulfo-acids are soluble in water and dye wool from the acid-bath, giving redder shades of blue than do the ordinary indigo-sulfo-acids known in commerce as "indigo-carmin."

The following examples are given of the manner in which the sulfonation may be accomplished.

Example 1: Mix about one part, by weight, of the new blue dyestuff with about ten parts, by weight, of ordinary concentrated sulfuric acid and heat the mixture at the temperature of the boiling-water bath until a test portion yields a clear solution in water. This point being arrived at, dissolve the whole in water and precipitate the sulfo-acid from the solution by the addition of common salt. Filter, press, and dry, and, if desired, convert into an alkaline salt.

Example 2: Mix about one part, by weight, of the new blue dyestuff with about six parts, by weight, of weakly-fuming sulfuric acid and allow the mixture to stand at a temperature of, say, about 50° centigrade or at a lower temperature until a sample is readily soluble in water. The lower the temperature at which the sulfonation is conducted the longer is the time required to attain complete solubility in water. The sulfo-acid formed is isolated in the manner above described—namely, by dissolving the whole in water, precipitating with common salt, filtering, pressing, and drying.

Instead of concentrated or fuming sulfuric acid mono-chlor-hydrin sulfuric acid ($SO_3HCl$) or sulfuric acid mixed with dehydrating agents can be used, when the result is similar and the same product is obtained.

This new dyestuff in the form of the free sulfo-acid is characterized by the following properties: It is a dark-blue powder, resembling indigo-carmin in appearance, readily soluble in both hot and cold water. It is scarcely soluble in alcohol and practically insoluble in ether. Boiling glacial acetic acid only dissolves it in sufficient quantity to just color the solution weakly blue, whereas the sulfo-acid of ordinary indigo, known in commerce as "indigo-carmin," dissolves in such quantity in boiling glacial acetic acid that the solution is very intensely blue. This new sulfo-acid dyes wool from the boiling-acid bath, yielding redder shades of blue than the above-mentioned indigo-carmin.

What is claimed is—

1. As an article of manufacture, a new blue dyestuff which can be derived from ortho-tolyl-glycocol and which in its unsulfonated form is a dimethyl indigo and has the following composition $C_{18}H_{14}N_2O_2$; it resembles ordinary indigo in appearance being when dry a dark-blue powder; on heating, it volatilizes and sublimes, yielding purple-red vapors; it is insoluble in water, slightly soluble in alcohol, particularly when hot; it is somewhat soluble in benzene at ordinary temperatures and more easily on heating, whereas ordinary indigo is very nearly or practically quite insoluble in this solvent; it is also somewhat soluble in cold anilin; it gives greener shades on cotton when dyed from the vat than ordinary indigo does; when dyed in the form of its new soluble sulfo-acids it gives redder shades on wool than do the ordinary indigo sulfo-acids.

2. The process of manufacturing a dyestuff which consists in melting ortho-tolyl-glycocol with alkali and subsequent oxidation by suitable means such as an air-blast, substantially as described.

LIVINGSTON GIFFORD,
*Administrator of the estate of Karl Heumann, deceased.*

Witnesses:
M. WILSON,
C. RATHIEN.